Dec. 11, 1951 W. E. BERNDSEN 2,577,872
ADJUSTABLE FLOW FOUNTAIN TYPE WASHER DEVICE
Filed June 29, 1949 2 SHEETS—SHEET 1

INVENTOR.
WILLIAM E. BERNDSEN
BY
ATTORNEYS

Dec. 11, 1951        W. E. BERNDSEN        2,577,872
ADJUSTABLE FLOW FOUNTAIN TYPE WASHER DEVICE
Filed June 29, 1949        2 SHEETS—SHEET 2

INVENTOR.
WILLIAM E. BERNDSEN
BY
*West & Oldham*
ATTORNEYS

Patented Dec. 11, 1951

2,577,872

UNITED STATES PATENT OFFICE 2,577,872

ADJUSTABLE FLOW FOUNTAIN TYPE WASHER DEVICE

William E. Berndsen, Cleveland, Ohio

Application June 29, 1949, Serial No. 102,019

6 Claims. (Cl. 15—130)

This invention relates to washer devices, particularly to a mobile washer device that is adapted to be coupled to a cleaning fluid source, such as a hose, and to have the cleaning fluid ejected through the washer device in a controllable manner.

In using a mobile washer device for a common use, such as washing an automobile, it frequently is desirable to have a rather vigorous cleaning action effected by the fluid cleaning material used. Thus in cleaning mud and other dirt from an automobile, it usually is desired to play a fast-moving stream of cleaning fluid against the vehicle, particularly when cleaning underneath the fenders or body of the vehicle. However, when the general cleaning action is to be effected, at such time it is desired to have the cleaning fluid come out through the cleaning material or pad in the form of a relatively slow-moving current which would completely saturate the cleaning pad with cleaning fluid at all times and have such cleaning fluid flowing through the pad.

The general object of the present invention is to provide a washer device of the class described wherein the device is characterized by the fact that a controllable stream of cleaning fluid is available at all times in the mobile washer device.

Yet another object of the invention is to provide a mobile washer device which is of relatively inexpensive but lasting construction.

A further object of the invention is to provide a washer device which has a valve member associated therewith for controlling the stream of cleaning fluid and the path of same through the washer device.

Another object of the invention is to provide an automobile washing device wherein a stream of fast-moving liquid is available in the device without passing through a cleaning sponge associated therewith whereas a slow-moving stream of cleaning fluid also can be provided and be caused to flow through the cleaning pad forming a portion of the washer device.

A further object of the invention is to provide a readily movable valve plate in a washer device wherein the valve plate is at least partially supported by washer means which may aid in the valve control action.

A further object of the invention is to provide a washer device which can be grasped by a rigid handle member associated therewith, which device also has a rigid backing plate provided thereon and with such backing plate being protected against contact with the object being washed.

Yet another object of the invention is to provide a washer device which can be manually used without contact with the cleaning fluid passing through the washer device.

The foregoing and other objects and advantages of the invention will be made more apparent as the specification proceeds.

For a better understanding of the present invention, reference should be had to the accompanying drawings, wherein.

Figure 1:
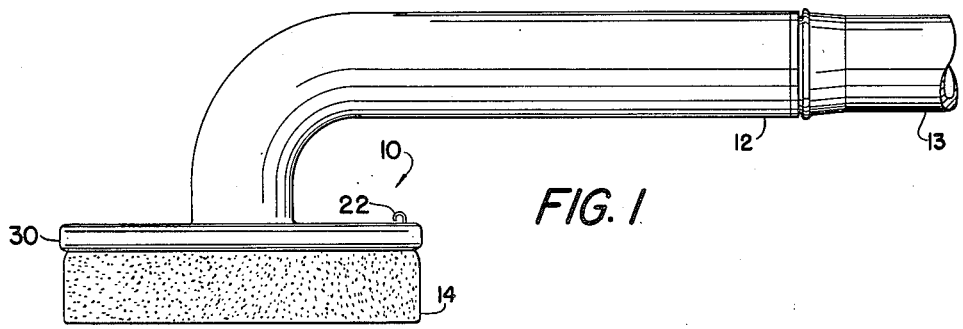
Fig. 1 is an elevation of a washer device embodying the principles of the invention.

In order to understand the details of the construction shown in the drawings, the portions of the washer device of the invention will be described in detail hereinafter. The drawings illustrate a washer device 10 which includes a backing plate 11, usually made from a rigid metallic plate of suitable composition. This backing plate 11 is shown as having a control and coupling tube or handle 12 rigidly secured thereto and extending from the back surface of the backing plate 11. Usually the tube 12 has a right angled bend therein to provide a convenient rigid handle device for use in maneuvering and controlling the washer device 10. The exposed end of the tube 12 is adapted to engage with a suitable source of cleaning fluid, such as a conventional garden hose 13. Thus the washer device of the invention is mobile but yet still has a constant source of cleaning fluid, usually liquid, supplied thereto through the hose 13.

Cleaning action preferably is obtained by use of the sponge pad 14 which is removably secured to the face surface of the backing plate 11. This sponge pad 14 is of the general type disclosed in and covered by my co-pending patent application Ser. No. 620,893, now Patent No. 2,486,102, dated October 25, 1949. In this type of a removable pad and backing plate construction, the backing plate 11 is shown as provided with a pair of in-turned flanges 15 that may be formed integrally with the backing plate 11. Usually the backing plate 11 has a continuous edge flange 16 formed thereon extending completely around the margins thereof with the retaining flanges 15 being provided at the outer ends or edges of the flange 16 at the end portions of the backing plate 11. To engage with the retaining flanges 15, the sponge pad 14 is shown as provided with a pair of resilient, rectangularly shaped wire looped reinforcing members 17. These reinforcing members 17 are resilient and are deflectable over the entire length thereof. The members 17 are provided with ends 18 that are positioned adjacent each other at one end of the pad 14. The remainder of the reinforcing members 17 are embedded in the pad 14 except for the portion thereof forming a continuous end of the member 17 with such end being opposed to the actual ends 18 of the wire member used in forming the reinforcing member 17. In other words, the reinforcing members 17 may be formed from a wire loop which originally is of substantially U-shape and which then can be telescoped into engagement with longitudinal extending holes formed in the sponge pad 14. After such wire means are engaged with the pad 14, then the ends 18 thereof can be folded inwardly upon the pad to engage the wire tightly therewith and form an excellent reinforcing member therefor by which the pad 14 can easily be removably snapped in under the flanges 15 to be engaged with the backing plate 11. These reinforcing members may merely be bowed outwardly at the center thereof when the end portions of same are snapped in under the flanges 15 to engage therewith, or the actual ends 18 of the member 17 can be laterally distorted and then "threaded" into engagement with one of the flanges 15 after the opposite end portion of the members have been engaged with the corresponding opposite flanges 15. It will be appreciated that in some instances only one reinforcing member 17 might be provided for the pad 14, or the pad 14 might be otherwise secured to the backing plate in either a removable or a fixed manner, as desired, although the preferred form of the invention is shown and described herein.

As an important feature of the present invention, a valve device is provided intermediate the tube 12 and the pad 14 in order to control discharge of cleaning liquid from the tube 12. This valve device in the present embodiment of the invention comprises a valve plate 19 that has a plurality of arcuate slots 20 formed therein at circumferentially spaced portions of the plate and through which rivets or other suitable securing devices 21 extend to secure the valve plate slidably to the front surface of the backing plate 11. An extension or control flange 22 is shown provided on the valve plate 19 and extends therefrom out through an arcuate slot 23 provided in the backing plate 11 whereby such control flange 22 is readily accessible at all times for moving the valve plate 19 arcuately with relation to the backing plate 11. The valve plate 19 has a plurality of discharge ports 24, usually of substantially elliptical shape formed in circumferentially spaced portions thereof spaced outwardly radially with relation to the center of movement of the valve plate 19. These valve ports 24 are adapted to be moved into register with discharge ports 25 that are provided in the backing plate 11. The arcuate movement of the valve plate 19 is sufficient to open or close the ports 25, as desired. Furthermore, the construction of the valve device of the invention is such that only a limited movement of the valve plate is necessary in order to effect a complete reversal of the valve action.

Another striking feature of the present invention is that a discharge tube or nozzle 26 is provided for the tube 12 and with such nozzle 26 being fixed in relation thereto by being secured to the backing plate 11. This discharge nozzle 26 registers with a hole or bore 27 that is formed in the sponge pad 14 and extends therethrough from the front to the rear surface thereof. Thus, regardless of the position of the valve plate 19, a stream of water will pass through the discharge nozzle 26. Hence when the valve plate is in its closed position, the fluid pressure provided will very forcibly eject the water from the hose 13. However, when valve plate 19 is open, liquid supplied through the hose 13 and tube 12 goes into the sponge pad 14 and only a relatively small stream is weakly ejected from the nozzle 26.

Figure 2:
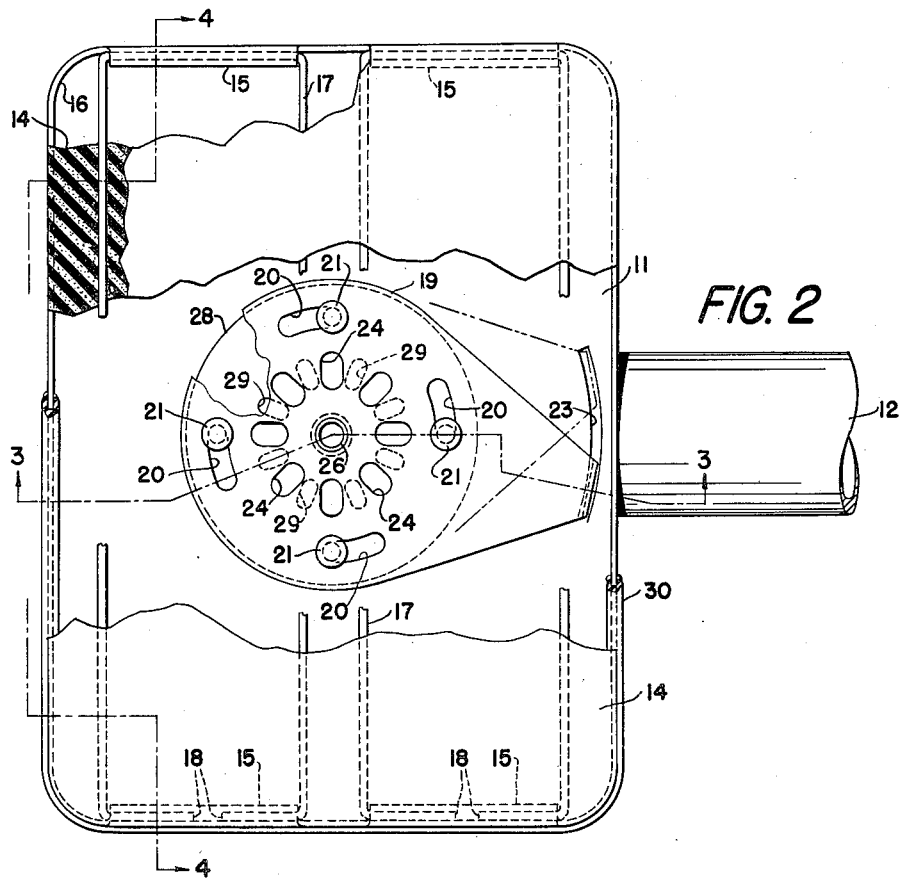
Fig. 2 is a bottom plan, enlarged, of the device of Fig. 1 with portions thereof being broken away and some being shown in section to show the construction of the device.
Figure 3:
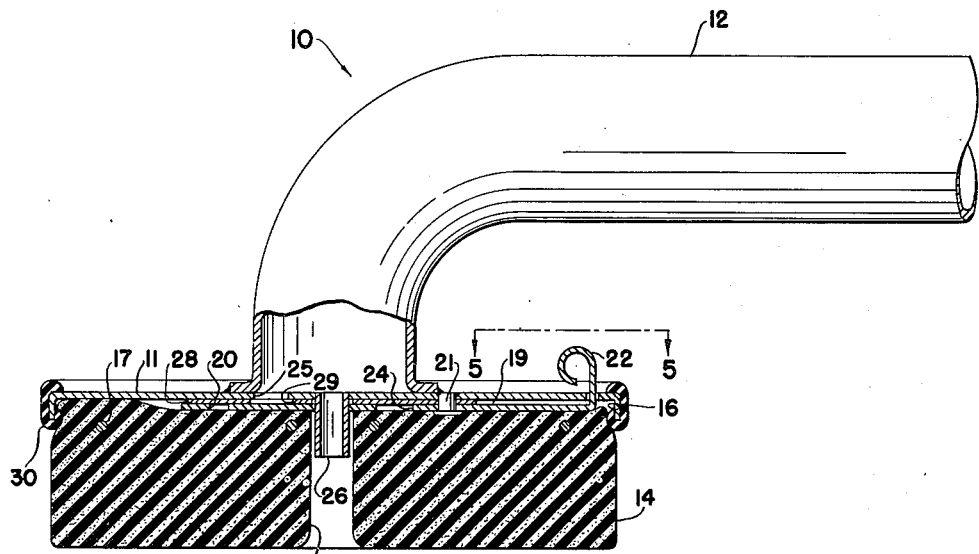
Fig. 3 is a vertical section taken on line 3—3 of Fig. 2.
Figure 4:
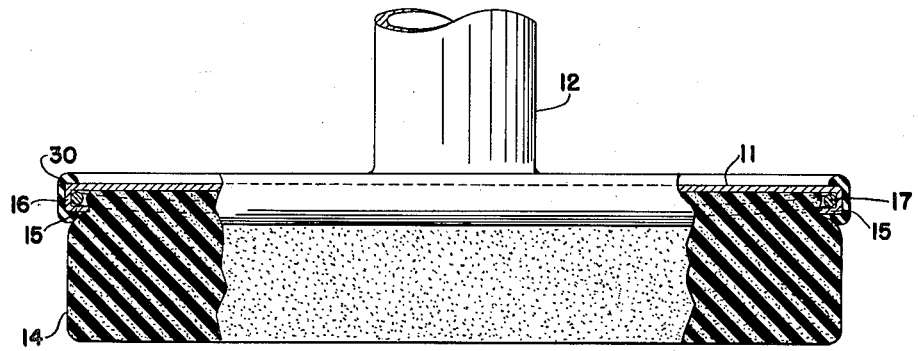
Fig. 4 is another vertical section taken on line 4—4 of Fig. 2.
Figure 5:
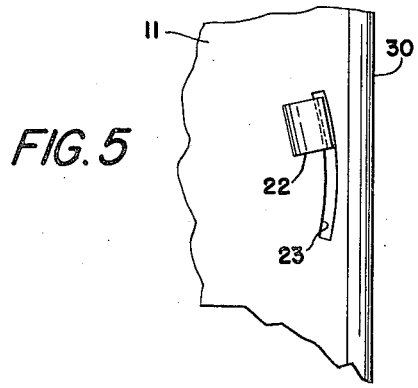
Fig. 5 is a fragmentary plan of a portion of the device of the invention taken on line 5—5 of Fig. 3.

Usually in order to aid in positioning the valve plate 19 and to aid in securing a desired shut-off of such shut valve, the valve plate 19 is separated from the backing plate 11 by a washer disc 28. The washer 28 is made from any conventional material and normally is concentrically positioned around the nozzle 26, being substantially equal in diameter to the substantially round portion of the valve plate. Figs. 2 and 3 of the drawing best show that the washer 28 has a plurality of ports 29 formed therein usually of exactly the same size as the ports 25 and continually registered therewith. Thus the washer 28 retains the valve plate 19 in substantial parallel relationship to the backing plate 11 and prevents contact therebetween while insuring good valve closing action by the plate 19. The rivets 21 are secured at their upper ends to the plate 11 and pass snugly through the washer 28 to position same and freely pass through the slots 20 to engage with the farther side of the valve plate 19 to position same in sealed but movable relation to the plate 11.

In order to prevent the backing plate 11 from ever injuring or marring any article being washed by the device 10, a conventional rubber bumper 30 is shown engaged with the edge portion of such backing plate. It will be appreciated that in any embodiment of the invention any desired number of discharge ports may be provided and they may be of any desired figuration or shape. Likewise, in some instances, it may be desired to use a different type of a member than the tube 12 for engaging with a garden hose 13 and any suitable coupling member may be used. Such coupling member may also serve as a handle for the washer device in some instances.

The backing plate 11 may be formed of any desired material and a plastic plate would probably not require a bumper strip 30. The washer 28 may be secured to the backing plate 11 or to the valve plate to register permanently with the ports in either of such members. The pad 14 used may be of any desired construction and be secured to the backing plate in any conventional manner.

Having thus described my invention, what I claim is:

1. In a washer device, a backing plate having at least one opening therein, a rigid control and coupling tube secured to said backing plate and extending from the rear surface thereof, said tube being adapted to be coupled to a source of cleaning liquid and communicating with said opening in said backing plate, a sponge pad removably engaged with the front surface of said plate and covering said opening therein, a control valve plate on said backing plate slidably positioned intermediate said backing plate and said sponge pad on the front surface of said backing plate over the opening therein and controlling liquid flow from said tube, said sponge pad having a hole therein extending therethrough from the front to the rear surface thereof, a discharge nozzle on said backing plate and protruding through said valve plate to extend into said hole in said sponge pad, said discharge nozzle communicating with said tube, said control valve plate having a discharge port in appreciably spaced relation to said discharge nozzle but movable into communication with said tube by registration with said opening in said backing plate for discharge of cleaning liquid into said sponge pad, and a washer for said valve plate positioned intermediate said backing plate and said valve plate to aid in positioning said valve plate in an adjustable manner, said valve plate being movable to open or close said discharge port.

2. In a washer device, a backing plate having at least one opening therein, a rigid control and coupling tube secured to said backing plate and extending from the rear surface thereof, said tube being adapted to be coupled to a source of cleaning liquid and communicating with said opening in said backing plate, a sponge pad engaged with said plate and positioned on the front surface thereof over the opening therein, a control valve plate on said backing plate slidably positioned intermediate said backing plate and said sponge pad on the front surface of said backing plate over the opening therein and controlling liquid flow from said tube, said sponge pad having a hole therein extending therethrough from the front to the rear surface thereof, and a discharge nozzle on said backing plate and protruding through said valve plate to extend into said hole in said sponge pad, said discharge nozzle communicating with said tube, said control valve plate having a discharge port therein for registration with said opening in said backing plate and communication with said tube for discharge of cleaning liquid into said sponge pad, said valve plate being movable to open or close said discharge port.

3. In a washer device, a backing plate having at least one opening therein, means for providing said backing plate with a supply of cleaning liquid, said means communicating with said opening in said backing plate, a cleaner pad positioned on the front surface of said plate over said opening, a control valve on said backing plate movably positioned intermediate said backing plate and said cleaner pad on the front surface of said backing plate over the opening therein and controlling liquid flow from said means, said cleaner pad having a hole therein extending therethrough from the front to the rear surface thereof, and a discharge nozzle on said backing plate and protruding through said valve plate to extend into said hole in said sponge pad, said discharge nozzle communicating with said means, said control valve having at least one discharge port therein for registration with said opening in said backing plate to communicate with said means for discharge of cleaning liquid into said sponge pad, said control valve being movable to open or close said discharge port.

4. In a washer device, a backing plate with an opening therein, a control and liquid supply tube engaged with said backing plate and extending from the rear surface thereof in registration with the opening therein, a cleaner pad engaged with said plate on the front surface thereof over said opening therein, a control valve on the front of said backing plate positioned intermediate said backing plate and said pad for controlling liquid flow from said tube through said opening in said backing plate, said pad having a hole therein extending therethrough from the front to the rear surface thereof, a permanently open discharge nozzle for said tube carried by and extending through said backing plate to communicate with said tube and extending into said hole in said sponge pad, said control valve having a plurality of discharge ports therein and movable into communication with said tube for discharge of cleaning liquid into said sponge pad, said backing plate having apertures therein for registration with said discharge ports in said control valve and communicating with said tube, and washer means for said control valve positioned intermediate said backing plate and said control valve.

5. In a washer device, a backing plate, a control and coupling tube secured to said backing plate and extending from the rear surface thereof, a sponge pad removably engaged with the front surface of said plate, a control valve plate positioned on said backing plate intermediate said backing plate and said sponge pad in communication with the end of said tube and controlling liquid flow from said tube by movement of the valve plate, said control valve plate having a plurality of circumferentially spaced controllable discharge apertures for discharge of cleaning liquid into said sponge pad, washer means for said control valve plate, said backing plate having a plurality of apertures therein adapted to register with at least some of the apertures in said valve plate when the valve plate is in its discharge position, said backing plate apertures registering with said tube, said sponge pad being positioned over said apertures in said backing plate to receive liquid from said tube when said control valve plate is in its discharge position, and means securing said valve plate to said backing plate for limited movement from a position substantially registering said apertures in said valve and backing plates to a closed position with relation thereto, and said washer means comprises a disc positioned intermediate said valve plate and said backing plate for sealing around the apertures in said backing plate.

6. In a washer device, a backing plate, a control and coupling tube secured to said backing plate and extending from the rear surface thereof, a cleaner pad removably engaged with the front surface of said plate, a control valve plate positioned on said backing plate intermediate said backing plate and said pad in communication with the end of said tube and controlling liquid flow from said tube by movement of the valve plate, said control valve plate having a plurality of circumferentially spaced controllable discharge apertures for discharge of cleaning liquid into said pad, said backing plate having a plurality of apertures therein adapted to register with at least some of the apertures in said valve plate when the valve plate is in its discharge position, said backing plate apertures registering with said tube, said pad being positioned over said apertures in said backing plate to receive liquid from said tube when said control valve is in its discharge position, means securing said valve plate to said backing plate for limited movement from a position substantially registering said apertures in said valve plate and backing plates to a closed position with relation thereto, and a permanently open nozzle carried by said backing plate and connecting said tube and said pad.

WILLIAM E. BERNDSEN.

REFERENCES CITED

The following references are of record in the file of this patent:

UNITED STATES PATENTS

| Number | Name | Date |
|---|---|---|
| 1,193,086 | Thomsen | Aug. 1, 1916 |
| 1,506,305 | Kelly | Aug. 26, 1924 |
| 1,739,872 | Soss | Dec. 17, 1929 |
| 2,350,469 | Litka | June 6, 1944 |